(12) United States Patent
Tan et al.

(10) Patent No.: US 8,249,645 B2
(45) Date of Patent: Aug. 21, 2012

(54) RADIATION REDUCING APPARATUS FOR WIRELESS COMMUNICATION DEVICE

(75) Inventors: Chuan-Kang Tan, Shenzhen (CN); Lei Li, Shenzhen (CN); Shao-Hui Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 145 days.

(21) Appl. No.: 12/819,304

(22) Filed: Jun. 21, 2010

(65) Prior Publication Data
US 2011/0241940 A1   Oct. 6, 2011

(30) Foreign Application Priority Data

Mar. 30, 2010   (CN) .......................... 2010 1 0136128

(51) Int. Cl.
*H04M 1/00* (2006.01)
(52) U.S. Cl. ............... 455/550.1; 455/562.1; 455/575.5; 455/90.1
(58) Field of Classification Search ............... 455/550.1, 455/562.1, 575.5, 90.1; 331/177 R
See application file for complete search history.

(56) References Cited

U.S. PATENT DOCUMENTS

| | | | |
|---|---|---|---|
| 2002/0119808 A1* | 8/2002 | Seiki .............................. | 455/575 |
| 2003/0064761 A1* | 4/2003 | Nevermann .................... | 455/572 |
| 2008/0266012 A1* | 10/2008 | Yahata et al. .............. | 331/177 R |
| 2011/0159920 A1* | 6/2011 | Lehmann .................... | 455/556.1 |

* cited by examiner

*Primary Examiner* — Sanh Phu
(74) *Attorney, Agent, or Firm* — Altis Law Group, Inc.

(57) ABSTRACT

A radiation reducing apparatus for a wireless communication device includes a sensing module, a control module, and a radiation reducing module. The sensing module senses radiation intensity of the wireless communication device and generates a signal corresponding to the sensed radiation intensity. The control module compares the sensed radiation with a preset radiation intensity threshold. The radiation reducing module is activated by the control module to reduce the radiation of the wireless communication device when the sensed radiation intensity reaches the radiation intensity threshold.

14 Claims, 3 Drawing Sheets

RADIATION REDUCING APPARATUS FOR WIRELESS COMMUNICATION DEVICE

BACKGROUND

1. Technical Field

The disclosure generally relates to radiation reducing apparatuses, particularly to a radiation reducing apparatus used with a wireless communication device.

2. Description of Related Art

Wireless communication devices are widely used in everyday life. However, the long term effects of radiation emitted from the wireless communication devices are unknown.

Therefore, there is room for improvement within the art.

BRIEF DESCRIPTION OF THE DRAWINGS

Many aspects of the radiation reducing apparatus for wireless communication device can be better understood with reference to the following drawings. The components in the drawings are not necessarily drawn to scale, the emphasis instead being placed upon clearly illustrating the principles of the radiation reducing apparatus for wireless communication device.

DETAILED DESCRIPTION

Figure 1:
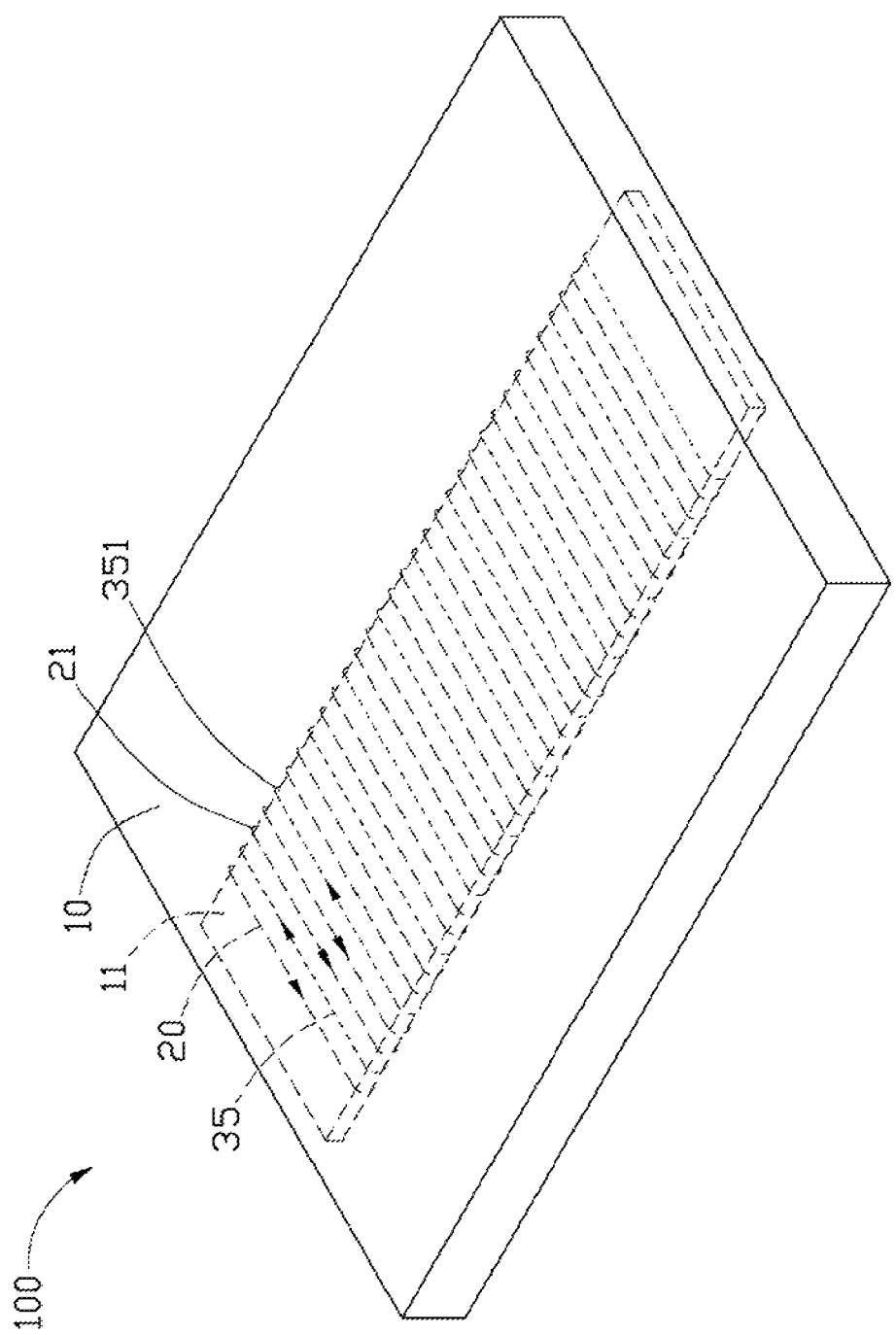
FIG. 1 is a schematic view of a wireless communication device employed with a radiation reducing apparatus, according to an exemplary embodiment.
Figure 2:
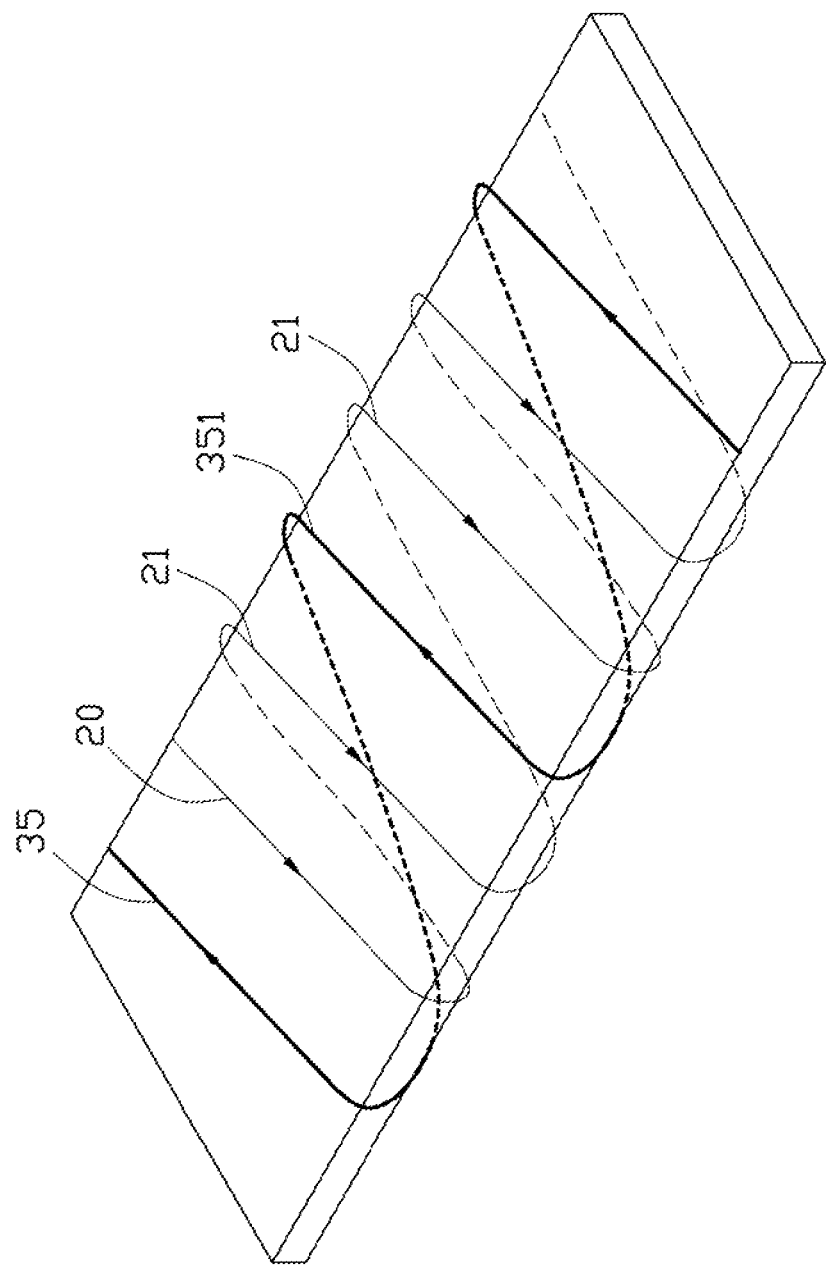
FIG. 2 is an enlarged and partially view of a signal radiating member and a radiation reducing module coiled around in a circuit board of the wireless communication device of FIG. 1.
Figure 3:
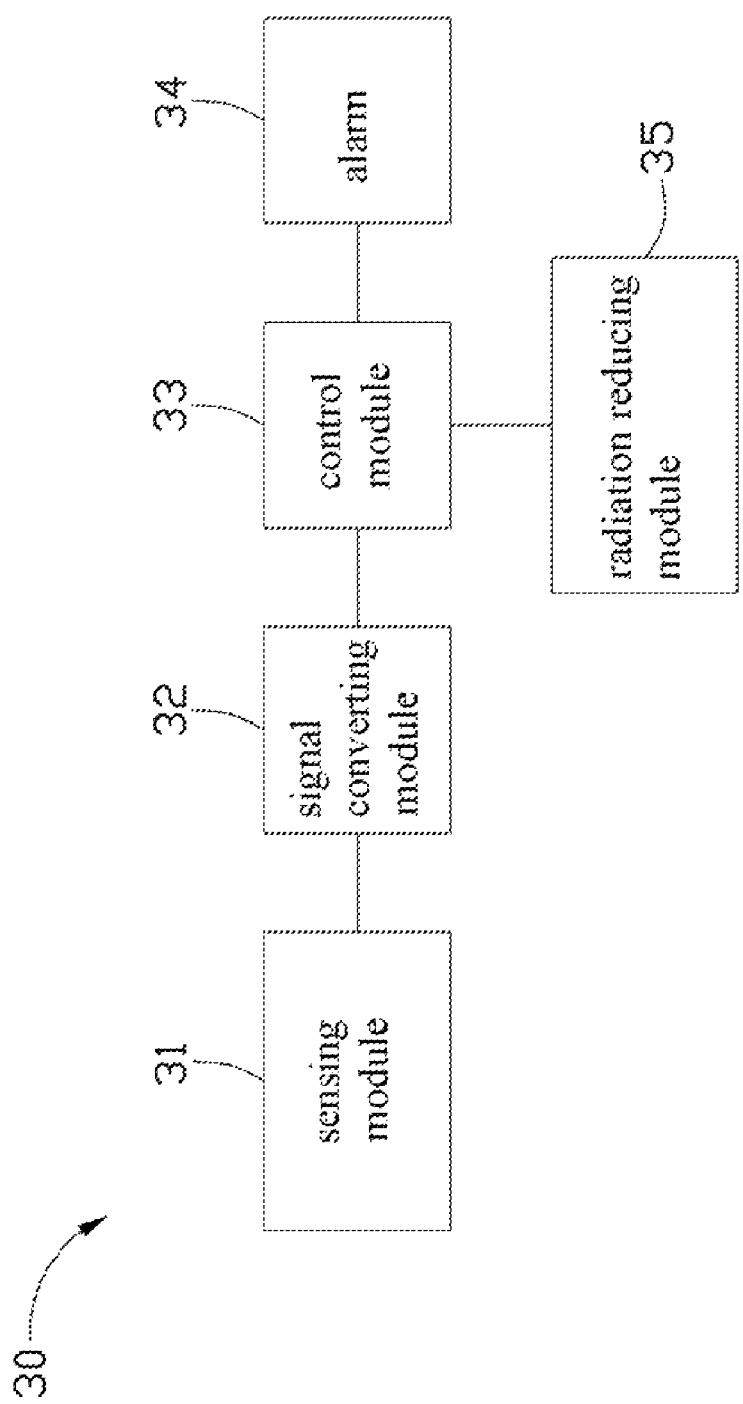
FIG. 3 is a block diagram of the radiation reducing apparatus of FIG. 1.

Referring to FIGS. 1, 2 and 3, a wireless communication device 100 (schematically shown), which may be a mobile phone or a personal digital assistant (PDA), according to one exemplary embodiment, includes a circuit board 10, a signal radiating member 20, and a radiation reducing apparatus 30.

The circuit board 10 may be a conventional main board of the wireless communication device 100 including a base 11 imbedded therein.

The signal radiating member 20 may be a conventional signal transmitting line positioned in or on the circuit board 10. The signal radiating member 20 spirally coils around the base 11 and forms a plurality of parallel and spaced-apart first sections 21 on one surface of the base 11. The signal radiating member 20 is configured to transmit signals of the wireless communication device 100 from the circuit board 10 and generates radiation thereby.

The radiation reducing apparatus 30 includes a sensing module 31, a signal converting module 32, a control module 33, an alarm 34, and a radiation reducing module 35. The sensing module 31, the signal converting module 32, a control module 33, and the alarm 34 are connected in series. The radiation reducing module 35 is connected to the control module 33.

The sensing module 31 senses the radiation intensity of the wireless communication device 100. In this exemplary embodiment, the sensing module 31 can include a magnetic resistor. The resistance of the resistor varies with variations in intensity of the radiation the resistor is exposed to, and the sensing module 31 generates a corresponding analog signal such as an electrical current or a voltage drop.

The signal converting module 32 may be an analog/digital (A/D) convertor. The signal converting module 32 obtains the analog signal from the sensing module 31, and converts the analog signal into a digital signal, and then sends the digital signal to the control module 33.

The control module 33 may be a conventional central processing unit (CPU) of the wireless communication device. A radiation intensity threshold is preset in the control module 33. The preset radiation intensity threshold may be any maximum value of radiation intensity. The control module 33 obtains the digital signal from the signal converting module 32 and compares the sensed radiation intensity corresponding to the digital signal with the preset radiation intensity threshold. When the sensed radiation intensity reaches the radiation intensity threshold, the control module 33 activates the alarm 34 and the radiation reducing module 35 until the sensed radiation intensity becomes lower than the radiation intensity threshold.

The alarm 34 is configured to generate an alert signal (e.g. sounds, light indications, etc) to warn users when the sensed radiation intensity reaches or exceeds the radiation intensity threshold.

Referring to FIG. 2 again, the radiation reducing module 35 is a wire coiled around the base 11 having a same coiling direction (i.e., coaxial) as the signal radiating member 20 and forms a plurality of parallel and spaced-apart second sections 351 on the one surface of the base 11.

In the exemplary embodiment, on a first surface of the base 11, the coils of the radiation reducing module 35 and the signal radiating member 20 do not cross each other. The first sections 21 and the second sections 351 are parallel and spaced-apart from each other; each second section 351 is adjacent to two first sections 21 at two sides thereof. On the opposite second surface of the base 11, the coils of the radiation reducing module 35 and the signal radiating member 20 do cross each other.

The current flow directions in the radiation reducing module 35 and the signal radiating member 20 are opposite, as symbolized by the arrowheads of FIG. 2. Therefore, when electrical current flows in the radiation reducing module 35, the radiation reducing module 35 generates radiation having an opposite emitting direction to the radiation generated by the signal radiating member 20, to cancel out at least portions of the radiation from the signal radiating member 20. Therefore, the radiation emitted by the wireless communication device 100 is reduced. The coils of the radiation reducing module 35 can be changed to adjust the radiation intensity generated thereby.

When using the wireless communication device 100, such as when making a call, the sensing module 31 senses the radiation produced, and generates an analog signal corresponding to the sensed radiation intensity. The signal converting module 32 converts the analog signal to a digital signal, and sends the digital signal to the control module 35. The control module 33 obtains the sensed radiation intensity according to the digital signal, and compares the sensed radiation intensity with the preset radiation threshold. When the sensed radiation intensity meets or exceeds the preset radiation threshold, the control module 33 activates the alarm 34 and the radiation reducing module 35. The alarm 34 generates a signal. The radiation reducing module 35 works to reduce the radiation of the wireless communication device 100 to below the radiation intensity threshold.

The wireless communication device 100 reduces the radiation thereof by the signal radiating member 20 when the radiation generated by the signal radiating member 20 is higher than a preset threshold.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A radiation reducing apparatus for a wireless communication device, comprising:
   a sensing module sensing radiation intensity of the wireless communication device, the sensing module comprising a magnetic resistor for generating a signal corresponding to the sensed radiation intensity of the wireless communication device;
   a control module comparing the sensed radiation with a radiation intensity threshold preset therein; and
   a radiation reducing module activated by the control module to reduce the radiation of the wireless communication device when the sensed radiation intensity reaches the radiation intensity threshold.

2. The radiation reducing apparatus as claimed in claim 1, wherein the radiation reducing module generates radiation to cancel out at least portions of radiation of the wireless communication device and reduces the radiation of the wireless communication device.

3. The radiation reducing apparatus as claimed in claim 1, wherein the radiation reducing module is a wire.

4. The radiation reducing apparatus as claimed in claim 1, further comprising an alarm generating a signal when the sensed radiation intensity reaches the preset radiation intensity threshold.

5. The radiation reducing apparatus as claimed in claim 1, further comprising a signal converting module converting the analog radiation signal from analog into digital.

6. A wireless communication device, comprising:
   a circuit board;
   a signal radiating member positioned in the circuit board to transmit signals for the wireless communication device and generating radiation; and
   a radiation reducing apparatus; including:
   a sensing module sensing radiation intensity of the wireless communication device, wherein the sensing module comprises a magnetic resistor for generating a signal corresponding to the sensed radiation intensity;
   a control module comparing the sensed radiation with a preset radiation intensity threshold; and
   a radiation reducing module activated by the control module to reduce the radiation of the wireless communication device when the sensed radiation intensity reaches the radiation intensity threshold.

7. The wireless communication device as claimed in claim 6, wherein the radiation reducing module generates radiation to cancel out at least portions of the radiation from the signal radiating member and reduces the radiation of the wireless communication device.

8. The wireless communication device as claimed in claim 6, wherein the signal radiating member is a signal transmitting line coiling around a portion of the circuit board and forming a plurality of parallel and spaced-apart first sections on a first surface of the portion of the circuit board.

9. The wireless communication device as claimed in claim 8, wherein the radiation reducing module is a wire coiled around a portion of the circuit board and forming a plurality of parallel and spaced-apart second sections on the first surface of the portion of the circuit board.

10. The wireless communication device as claimed in claim 9, wherein the first sections and the second sections are parallel and spaced-apart with each other; each second section is adjacent to two first sections at two sides thereof on the first surface of the base.

11. The wireless communication device as claimed in claim 10, wherein the radiation reducing module generates radiation having an opposite emitting direction to the radiation emitted by the signal radiating member.

12. The wireless communication device as claimed in claim 10, wherein the coils of radiation reducing module and the signal radiating member cross each other on the second surface the portion of the circuit board.

13. The wireless communication device as claimed in claim 6, further comprising an alarm generating an alarm signal when the sensed radiation intensity reaches the radiation intensity threshold.

14. The wireless communication device as claimed in claim 7, further comprising a signal converting module converting the analog radiation signal from analog into digital.

* * * * *